United States Patent [19]

Vogg et al.

[11] Patent Number: 4,620,492

[45] Date of Patent: Nov. 4, 1986

[54] PROCESS FOR PURIFYING FLUE GAS

[75] Inventors: Hubert Vogg, Karlsruhe; Hartmut Braun, Bad Herrenalb; Gabriele Jindra, Graben-Neudorf, all of Fed. Rep. of Germany

[73] Assignee: Kernforschungszentrum Karlsruhe GmbH, Karlsruhe, Fed. Rep. of Germany

[21] Appl. No.: 759,128

[22] Filed: Jul. 23, 1985

[30] Foreign Application Priority Data

Jul. 28, 1984 [DE] Fed. Rep. of Germany ....... 3427941
Oct. 4, 1984 [DE] Fed. Rep. of Germany ....... 3436339

[51] Int. Cl.$^4$ ........................ F23J 11/00; F23J 15/00
[52] U.S. Cl. ........................................ 110/345; 55/72;
110/344; 110/215; 110/216; 423/103; 423/240; 423/243
[58] Field of Search ............... 110/341, 215, 216, 344, 110/345; 55/37, 51, 72, 228, 233, DIG. 30; 423/103, 240 R, 241, 242, 243

[56] References Cited

U.S. PATENT DOCUMENTS

| | | |
|---|---|---|
| 3,789,109 | 1/1974 | Lyon et al. . |
| 3,791,812 | 2/1974 | Frank et al. . |
| 3,969,482 | 6/1976 | Teller . |
| 4,013,455 | 3/1977 | Kleeberg et al. . |
| 4,124,462 | 11/1978 | Reinhardt et al. . |
| 4,297,332 | 10/1981 | Tatani et al. . |
| 4,477,373 | 10/1984 | Grantham et al. ............. 110/216 X |

OTHER PUBLICATIONS

Abfallwirtschaft an der TU Berlin (Waste Treatment Policies at the Technical University of Berlin), vol. 7, pp. 1-41; 7-81.

*Primary Examiner*—Edward G. Favors
*Attorney, Agent, or Firm*—Spencer & Frank

[57] ABSTRACT

A process for the purification of flue gas generated during the combustion of waste materials has a first embodiment wherein soluble heavy metals are precipitated and recovered in a compact form and wherein the soluble heavy metal-free extraction residue is returned to the combustion system where noxious organic substances are pyrolyzed. In another embodiment, substantially all of the heavy metals from the flue gas are collected in a single solid residue, which residue may be thermally treated to recover mercury and the treated residues subsequently returned to the combustion system wherein noxious organic substances are pyrolyzed or combined in a hazardous waste stabilizing substance. In yet another embodiment of the process, heavy metals present in an acidic condensate solution from a condensation/scrubbing step are precipitated and the precipitated heavy metals are thermally treated, together with the flue ash, to remove mercury, after which the remaining solids may be returned to the combustion system to pyrolyze noxious organic substances contained therein or may be combined with a hazardous waste stabilization substance.

13 Claims, 3 Drawing Figures

Fig. 1 mass balance for heavy metals

PROCESS FOR PURIFYING FLUE GAS

BACKGROUND OF THE INVENTION

1. Field of the Invention

This invention relates to a process for purifying flue gas generated during the combustion of waste materials, such as municipal refuse, and containing gaseous, liquid, and particulate pollutants, and more particularly to flue gas purification processes in which soluble heavy metals, including mercury, are precipitated, the mercury recovered in a thermal treatment, and the solid residues returned to the combustion chamber to pyrolyze noxious organic substances and/or combined with a hazardous waste stabilizing substance.

2. Discussion of the Art

In flue gas purification systems, solid, liquid, and gaseous pollutants are separated from the flue gas with the aim of reducing damage to the environment to an acceptable degree. Particulate pollutants are typically separated from the flue gas leaving a combustion system by mechanical or electrical dry separation means, such as fabric or electrostatic filters and cyclone equipment, respectively. Wet dust removal means utilizing absorption, adsorption, and chemosorption processes are frequently employed as well. Such wet dust removal processes also serve to remove liquid and gaseous pollutants from the flue gas by absorption, adsorption, condensation and chemical reaction processes, and produce sludges and waste waters having a high concentration of dissolved solids. These sludges and waste waters frequently contain potentially toxic or hazardous levels of waste materials, such as heavy metals and noxious organic substances and, thus, usually require further treatment in order to reduce the environmental hazard they would present if casually disposed of.

Flue gas purification systems generally combine several basic processes into one overall process. One of the most popular waste material combustion processes for treating, for example, municipal refuse, is discussed in Abfallwirtschaft an der Tu Berlin [Waste Treatment Policies at the Technical University of Berlin], Volume 7, pages 1–41. The process provides for the removal of particulates from flue gas by means of electrostatic filters or fabric filters and the partial removal of the gaseous pollutants HCl, HF, and $SO_2$ from the flue gas by means of acid or alkali treatment, either upstream or downstream from the filter system. Heavy metals present in gaseous form, such as mercury vapor, and organic contaminants, such as chlorinated dioxins, however, have so far only been reliably removed by wet processes downstream from the filters.

Figure 1:
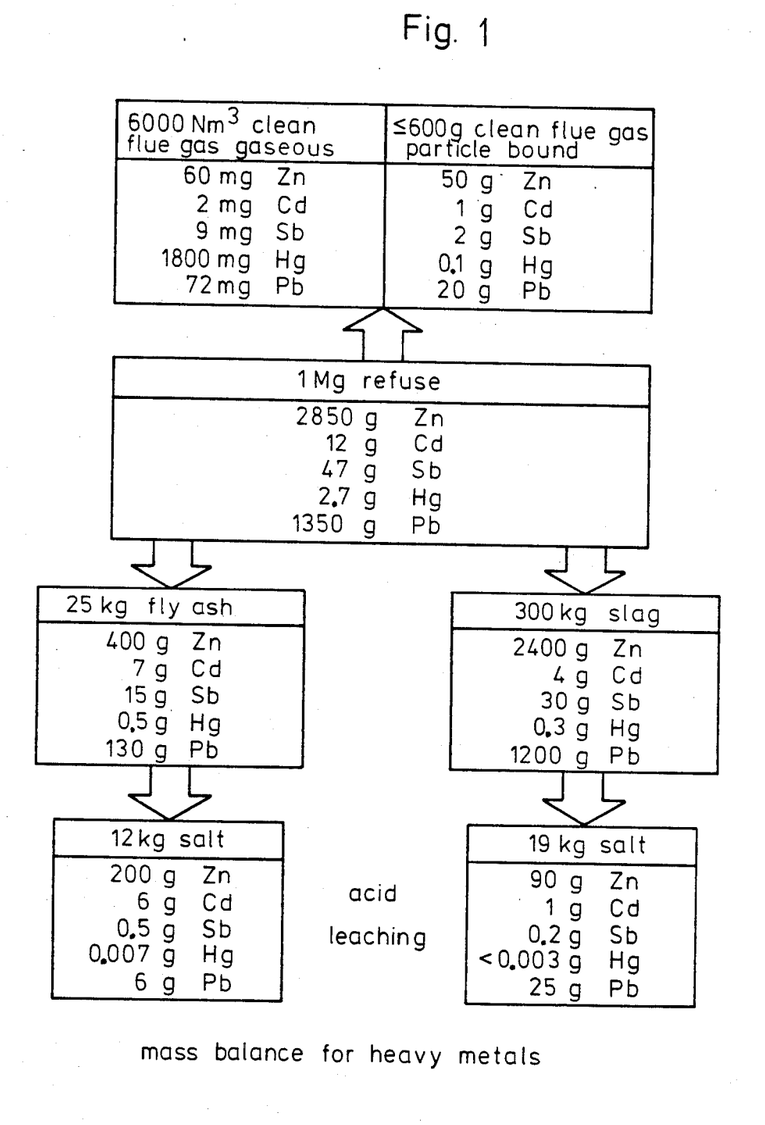
FIG. 1 is a mass balance for the most important heavy metals in a typical municipal refuse.

A significant drawback of conventional processes is that they typically produce a large quantity of particulates, about 30 kg of smoke particulates per ton of municipal refuse burned. These particulates, moreover, contain high concentrations of halogens, noxious organic substances, and heavy metal substances, sometimes in a form easily transported in the ecosystem. For example, the composition of a typical flue gas from the combustion of municipal refuse is given in Table 1. Table 3 lists the dioxin content of a typical flue ash. Further, the mass balance for the most important heavy metals typically found in municipal refuse is illustrated in FIG. 1. As may be seen, the safe handling of these pollutants, especially the heavy metal mercury and the particularly noxious organic substances belonging to the family of dioxins, poses a significant problem, particularly with a view toward recovery and unobjectional reuse of smoke particulates or decontamination and long-term, environmentally safe storage. Further, municipal authorities are imposing progressively stricter safety regulations for the handling of such waste materials and for the storage thereof in special hazardous waste depositories.

In his previous U.S. patent application, Ser. No. 06/617,941, coinventor Hubert Vogg addressed the problem of removing heavy metal contaminants from the flue gas purification process in a compact and concentrated form. The majority of particulates were removed from the flue gas in a dry separation system and collected as a flue ash. The flue gas leaving the dry separation system was passed through a condensation/scrubbing system, where vapors, including water, HCl, and heavy metal vapors, were separated by condensation and any remaining particulates were scrubbed from the flue gas. An acidic condensate solution was produced in the condensation step and was used to extract soluble heavy metals from the flue ash and the soluble heavy metals were then subjected to a precipitation reaction to remove them from the process in a compact and concentrated form. These process steps produced about 1 kg of heavy metal-containing residue for each ton of refuse processed. Thus, heavy metals, such as mercury, cadmium, lead, antimony, tin, and zinc were compactly removed from the process and were made available for recovery and reuse. The soluble heavy metal-free residues from the referenced process were returned to the combustion system and were made inert by reacting them with the slag at high temperatures to become fixed therein. Further, the flue gas, previously rendered free of particulates, condensed vapors and heavy metals, was washed with an alkali wash solution to remove polluting gases, including $SO_2$ and $NO_x$, to provide a purified flue gas which may be discharged through a stack into the environment. The acid condensate solution, after precipitation of heavy metals therefrom, was then combined with the alkali wash solution in a neutralization step which produced a clarification sludge and a clarified solution. The clarified solution was dischargeable into a sewer, while the clarification sludge could be returned to the combustion chamber.

Even though such a process results in recovery of heavy metal pollutants in a more compact and concentrated form, noxious organic substances continue to pose a signficant problem in such a process, whether or not present initially in the municipal refuse, since extraction of soluble heavy metals from flue ash with an acidic condensate solution does not influence noxious organic substances. The very heterogeneous composition of the waste materials involved in a refuse burning process allows numerous chemical reactions to occur. On the one hand, many materials undergo decomposition or evaporation at the typically prescribed combustion temperature of 800° C. On the other hand, reaction products released into the gas phase travel a long path from the combustion chamber through a heat exchanger and dry separtion means, while being continuously cooled down to about 200° C., and recombination reactions may take place and new organic substances may form. Thus, aliphatic and aromatic chlorinated compounds may be formed by the above-described mechanisms.

Generally, such organic compounds are collected along with the flue ash. The filters of the dry separation system may thus contain organic compounds of widely varying compositions and toxicities and in widely varying concentrations. The presence of organic substances, such as chlorinated dibenzene dioxin or dibenzene furan, presents a particularly significant disposal problem in view of their toxicity even in trace quantities. Final decontamination of flue ash containing such toxic substances at a hazardous waste depository becomes more difficult and may be prevented entirely by local hazardous waste management ordinances.

SUMMARY OF THE INVENTION

One purpose of the present invention is to provide a flue gas purification process in which soluble heavy metal substances are extracted and recovered in a compact and concentrated form and the soluble heavy metal-free extraction residue is returned to the combustion system where noxious organic substances are pyrolyzed.

To accomplish this purpose, a process is provided in which the majority of particulates from the flue gas leaving a combustion system are separated in a dry solids separation system and are collected as flue ash; vapors, including water, hydrochloric acid and heavy metal vapors, from the flue gas after it leaves the separation system are condensed in a condensation/scrubbing system which forms an acidic condensate solution and which scrubs the remaining particulates from the flue gas; soluble heavy metals from the collected flue ash are extracted with the acidic condensate solution from the condensing step to provide a purified residue; and the purified residue is returned to the combustion system and noxious organic substances contained therein are pyrolyzed to thermally decompose them into harmless substances.

A further purpose of the instant invention is to provide a flue gas purification process in which substantially all of the heavy metals from the flue gas are collected in a single solid residue, which residue may be thermally treated to recover mercury and the residue subsequently returned to the combustion system wherein noxious organic substances are pyrolyzed or combined in a hazardous waste stabilizing substance.

To accomplish this purpose, a flue gas purification process is provided in which, after separating and collecting the flue ash, and after condensing and scrubbing the flue gas, the collected flue ash, the acidic condensate solution and a precipitation agent are mixed together to precipitate dissolved heavy metals and thereby concentrate the particulates generated during the combustion, including precipitated heavy metals, into a single solid residue.

Yet another purpose of the present invention is to provide a flue gas purification process in which the heavy metals present in an acidic condensate solution from a condensation/scrubbing step are precipitated and thermally treated, together with the flue ash, to remove mercury, after which the remaining solids may be returned to the combustion system to pyrolyze noxious organic substances contained therein or may be combined with a hazardous waste stabilization substance.

To accomplish this purpose, a flue gas purification process is provided in which, after separating and collecting the flue ash, and after condensing and scrubbing the flue gas, the acidic condensate solution and a precipitation agent are reacted to precipitate dissolved heavy metals and an acidic slurry is obtained; the flue gas, previously rendered free of particulates, condensed vapors and heavy metals, is washed with an alkali wash solution to remove polluting gases and provide a purified flue gas; the acidic slurry is neutralized by combining it with the alkali wash solution, thereby providing a clarification sludge; and the clarification sludge and the flue ash are subjected to thermal treatment in order to recover the mercury contained therein.

BRIEF DESCRIPTION OF THE DRAWING

The invention may be better understood by referring to the detailed description of the invention when taken in conjunction with the accompanying drawing in which.

DETAILED DESCRIPTION OF THE INVENTION

The flue gas purification processes according to the present invention are seeking to protect the environment from solid, liquid, and gaseous pollutants of various types. Gaseous pollutants, such as HCl, $SO_2$, $NO_x$, and heavy metal vapors such as Hg, and the soluble heavy metal contaminants contained in flue gas particulates and slag from combustion systems, and noxious organic substances can be selectively controlled so that mercury may be recovered, the organics decomposed, and only inert and/or fixed components remain. Residues may be combined with a hazardous waste stabilization substance, such as the combustion slag itself or bitumen, in such a manner that long-term stability and safe reuse or storage are assured.

Although the invention employs wet-chemical steps, they are designed to operate with a minimum of water consumption, while meeting the requirements for purification of the gas phase, to dissolve flue ash contaminants and to keep the ash pure. Thus, the in-line water consumption is about 50% of that of conventional processes. Further, typical purification yields for the flue gas are given in Table 1, and the acidic condensate solution leaching of flue ash removes the mobile, i.e., soluble, portions of heavy metals down to a scale demonstrated in Table 2.

One point of novelty of the present invention lies in its use of process steps which produce concentrated heavy metal residues. For example, about 1 kg of flue ash residue containing heavy metals is produced for each ton of refuse processed. This is compared to prior art methods which produce about 30 kg of flue ash residue containing less concentrated heavy metals for each ton of refuse processed, which, further, can only be decontaminated with difficulty at storage locations.

The 1 kg/ton residue produced according to one embodiment of this invention essentially corresponds to the actual quantity of heavy metal contaminants that are removed directly from the process. In the case of mercury, lead, or cadmium recovery, for example, by producing sulfides of these metals, it is even possible to completely eliminate the metals from the process without leaving any residue. Further, these compact residues generally have heavy metals bound therein in an insoluble form and may be unobjectionally reused or stored.

Precipitation agents are used for precipitating dissolved heavy metals from a solution. Preferred precipitation agents are sulfides, such as $Na_2S$ or less foul smelling TMT ($C_3H_3N_3S_3$). For example, dissolved mercury may be precipitated by TMT from an aqueous solution in a yield of 99%, as follows:

Moreover, the present process provides for thermal treatment of mercury-containing residues at flue gas temperatures to desorb the mercury which may be collected (see Table 5). The mercury-free residues may generally then be returned to the combustion system, unobjectionably reused, or bound in a hazardous waste stabilizing substance and stored.

A further point of novelty of the present invention lies in the closed circulation of organic substances, noxious and otherwise, which are formed in the process, collected primarily together with the flue ash, and thermally decomposed, i.e., pyrolyzed by returning them to the combustion system. Although extraction of soluble heavy metals from flue ash using an acidic condensate solution does not generally chemically change the organic substances, the removal of heavy metals from the flue ash opens the way for the return of the treated flue ash to the combustion system without building up progressively larger quantities of heavy metals therein (see Table 2).

The procedures employed for disposing of salt loads, i.e., dissolved solids, in waste water from the process depend on the particular location. Normally, waste water from the present invention can be discharged without objection into a sewer, as it is free of heavy metals. If a sewer is not at hand, another advantageous removal variation is available which applies to flue ash, as well as other residues and dissolved solids. The materials may be combined with a hazardous waste stabilizing substance, such as bitumen, or even the slag from the process.

Figure 2:
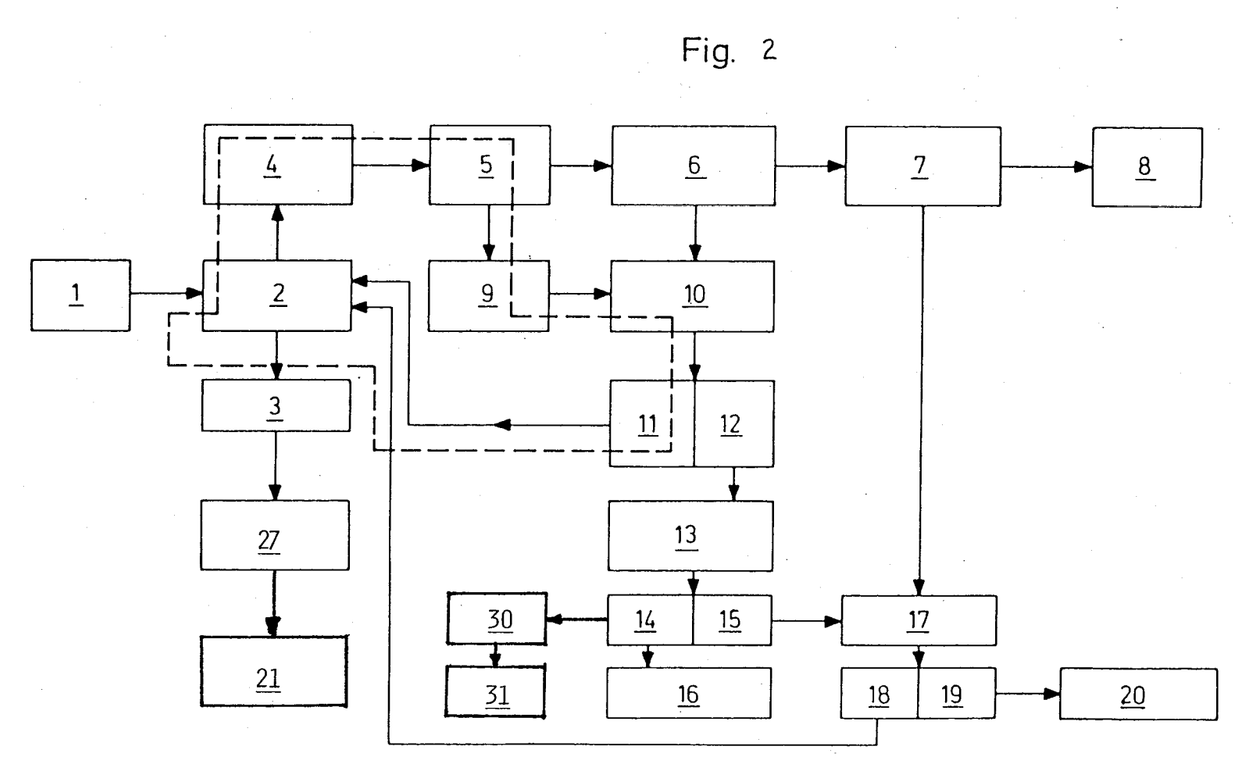
FIG. 2 is a block flow diagram of one process according to the invention, wherein soluble heavy metals are precipitated and recovered in a compact form and wherein the soluble heavy metal-free residue is returned to the combustion system where any noxious organic substances formed in the steps enclosed by dashed lines are pyrolyzed.

With reference to FIG. 2, shown schematically is a block diagram of one embodiment of a process according to the present invention. Waste materials, such as municipal refuse 1, is fed into combustion system 2 and burned. This produces heat, together with flue gas and slag 3. Part of the heat is recovered from the flue gas in a heat exchanger system 4, and used for other purposes. Following this heat recovery, the flue gas is subjected to dry solids separation 5 by means of a cyclone or electrostatic filter at about 180° C. and a flue ash 9 is collected. Care must be taken, both during separation and during heat recovery, to be sure that the temperature does not drop below the dew point for any of the components of the flue gas, such as water vapor or the like.

For the gases and vapors passing through the filter or the cyclone, the dry solids separation process 5 is followed by a condensation/scrubbing process 6, in which vapors, such as water, HCl, HF, and heavy metal vapors, are condensed and any remaining particulates are scrubbed from the flue gas. The remaining residual flue gas, containing gaseous pollutants, such as $SO_2$ and $NO_x$, is then subjected to an alkali wash 7 and a purified flue gas, substantially free of gaseous pollutants, is conducted to stack 8 and discharged into the atmosphere.

An acidic condensate solution is formed in the condensation process 6 and is combined with the flue ash 9 in reactor 10 to dissolve soluble heavy metals and extract them from the flue ash 9. The acidic condensate solution, containing HCl, reacts with the alkali flue ash to result in a final pH of about 3 (see Example 2). An extraction slurry is thus formed, and the extraction may be accelerated by including mechanical mixing means.

Extraction in reactor 10 is followed by solid-liquid separation, e.g., sedimentation, filtration or centrifuging. The result is a solid residue 11, which is a purified residue and is substantially free of soluble heavy metals, and an acidic filtrate 12 essentially composed of the acidic condensate solution and the dissolved heavy metals removed from the flue ash 9. The solid residue 11 is returned to the combustion system 2 (such as by feeding it to the refuse 1) in order to pyrolyze any noxious organic substances formed in the process steps enclosed in dashed lines to thermally decompose them into harmless substances, and to bind the solid residue 11 into the hotslag during the incineration process. Thus, at the high temperatures of the combustion process, for example, 800° C., the solid residue 11 is stabilized by being bound within the slag 3, the slag 3 thus functioning as a hazardous waste stabilization substance since residues bound in the slag are less mobile (less volatile and/or less soluble) with respect to the ecosystem.

Following solid-liquid separation, acidic filtrate 12 is subjected to heavy metal precipitation 13 wherein the precipitation agent is preferably a sulfide. After a second solid-liquid separation, the heavy metals are recovered in a compact and concentrated form as a heavy metal precipitate 14 and are available for possible reuse and/or recycling 16. The acidic filtrate 15, the supernatant from the heavy metal precipitation, is most advantageously combined with the alkali wash solution 7 for the purpose of providing a neutralized slurry in neutralization system 17.

The neutralized slurry may be separated into a clarification sludge 18 and a clarified solution 19 in a solid-liquid separation system. The clarification sludge 18 is preferably returned to the combustion system 2 where it is stabilized by being bound at high temperatures within the slag 3. This slag 3 is available for reuse 21, e.g. for road construction.

Alternately, the heavy metal precipitate 14 may be subjected to thermal treatment 30 at flue gas temperatures in order to desorb mercury contained therein. Table 5 gives examples of the percent desorption of mercury obtained at various process temperatures. Mercury may be very economically recovered in this way, using heat generated elsewhere in the process. The mercury may then be condensed and collected in collector 31. The remaining heavy metals from the thermal treatment 30 step, may be reused or recycled 16.

With continuing reference to FIG. 2, the slag 3 leaving the combustion system 2 contains no noxious organic substances, but may contain heavy metals. Slag 3 may contain heavy metal components which are not stabilized by having been bound during high temperature treatment in the combustion system 2 in spite of suitable conditions, and which could be objectionably leached out, for example, by ground water in the ecosystem. When such is the case, a subsequent extraction treatment is preferably conducted. This treatment comprises treating slag 3 with a weakly acidic solution having a pH of about 4 (see Example 3). In an advantageous manner, bath 27, in which slag 3 is generally quenched or cooled after it leaves the combustion system 2, is suitable for this subsequent treatment. Bath 27 typically consists of water. However, it is also conceivable that slag 3 may be sprayed with a weakly acidic mist to extract the soluble heavy metals from the slag by dissolving them. The dissolved heavy metals may then be removed from the system by precipitation, as above.

The clarified solution 19, having had clarification sludge 18 removed during the neutralization process 17, contains dissolved salts, such as chloride and sulfate salts, but is free from heavy metal contaminants and from noxious organic substances, and may be discharged into a sewer 20 to remove these salts from the system.

The following examples 1-7 illustrate features of the process of FIG. 2:

EXAMPLE 1

Condensation process 6 yields of $H_2O$, HCl and Hg:

In a large-scale combustion system, 1.12 m$^3$ of raw flue gas was passed through an electrostatic filter and 140 cm$^3$ of $H_2O$ was condensed out therefrom at room temperature. The condensed HCl quantity was 1004 mg/m$^3$ of flue gas, and represents 95% of the entire amount of HCl present. Together with the $H_2O$ and HCl, the condensed Hg quantity was 98 g of Hg/m$^3$ flue gas and represents 78% of the total amount of Hg.

EXAMPLE 2

Leaching behavior of flue ash 9 in reactor 10:
Ratio of solvent ($H_2O$) to flue ash=100:1.
Temperature=20° C.

| Soluble Components (%) | pH = 10 | pH = 3 |
| --- | --- | --- |
| As | 3.6 | 5.4 |
| Cd | — | 85 |
| Co | — | 20 |
| Cu | — | 10 |
| Ni | — | 30 |
| Pb | 0.1 | 4.6 |
| Sb | 1.4 | 3.0 |
| Zn | 0.01 | 53 |

EXAMPLE 3

Leaching behavior of slag 3 in bath 27:

| Components (%) | pH = 0 | pH = 4 |
| --- | --- | --- |
| Zn | 0.1 | 4 |
| Pb | n.d. | 2 |
| Cd | n.d. | 25 |

(n.d. = none detectable)

EXAMPLE 4

Composition of a typical flue gas before and after purification, see Table 1.

EXAMPLE 5

Overall recovery of heavy metals, see FIG. 1:

| | |
| --- | --- |
| Zn | 10% |
| Cd | 60% |
| Pb | 2-3% |

The main goal of the extraction process in reactor 10 according to the invention is the reduction of the mobile (i.e., soluble and/or volatilizable) portions of heavy metals remaining in the solid residue 11. Of special noteworthiness is the 60% reduction achieved for the toxic element cadmium, Cd.

EXAMPLE 6

Stability and inertness of flue ash residue 11 after extraction in reactor 10 with acidic condensation solution from condensation process 6 and of slag after weak acid leaching 27:

An additional second acid leaching test leads to the following elution rates:

| | flue ash residue | slag |
| --- | --- | --- |
| Zn | <1% | <1% |
| Cd | <1% | <1% |
| Pb | n.d. | n.d. |
| Sb | n.d. | n.d. |
| Ni | n.d. | n.d. |

(n.d. = none detectable)

EXAMPLE 7

Heavy metal waste water analysis of clarified solution 19 after neutralization step 17:

| | |
| --- | --- |
| Zn | 0.5 mg/l |
| Cd | 0.02 mg/l |
| Pb | 0.5 mg/l |
| Cu | 0.1 mg/l |
| Hg | 0.05 mg/l |

Figure 3:
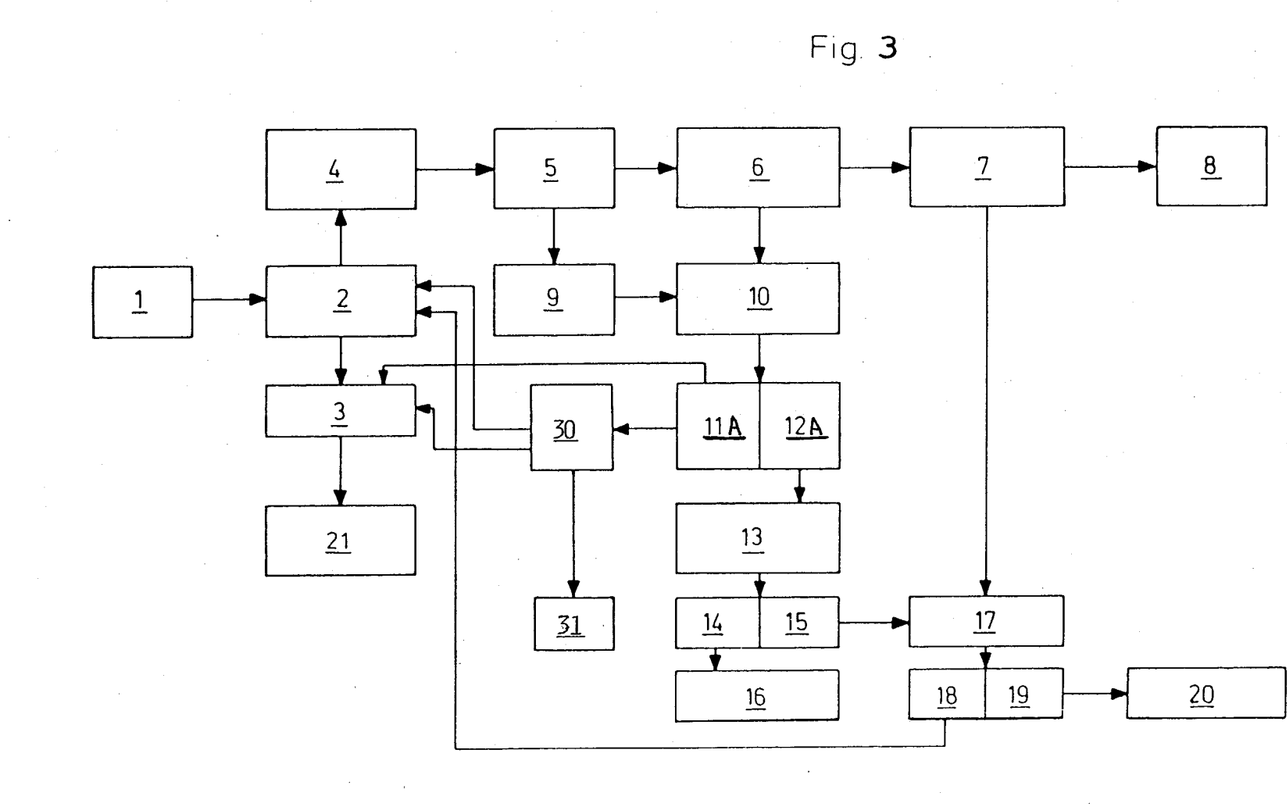
FIG. 3 is a block flow diagram of another process according to the invention, wherein a single solid residue containing substantially all of the heavy metals from the raw flue gas may be thermally treated to recover mercury before being returned to the combustion system to pyrolyze noxious organic substances contained therein or combined in a hazadous waste stabilization substance.

With reference to FIG. 3, the numbered steps in the block diagram correspond to those discussed previously regarding FIG. 2 and a repetition of their description is therefore not necessary. In this embodiment of a flue gas purification process according to the present invention, the soluble heavy metals contained in the acidic condensate solution from condensation scrubbing step 6 are mixed with the collected flue ash 9 to extract the mobile contents of heavy metals out of the flue ash 9, and to remove mercury in the acidic condensate into the flue ash 9.

Table 4 presents examples of mercury adsorption. The advantage of adsorption is shown by the dependence of the concentration of mercury remaining in the filtrate 12A upon the quantity of flue ash 9 present during the adsorption. This is an unexpected result. The flue ash 9 is believed to adsorb and to reduce the mercury, and to thus act as a separation aid.

The single solid residue 11A is separated from the supernatant liquid in a solid/liquid separation system, such as by centrifuging, sedimentation, or filtration, to obtain an acidic filtrate 12A. The acidic filtrate 12A may be combined with alkali wash solution from the alkali washing step 7 in a neutralization step 17, etc., (not shown) as previously discussed. However, acidic filtrate 12A is preferably reacted with a precipitation agent or any other separation techniques, e.g. ion exchange or electrochemical methods to precipitate any or to remove remaining heavy metals. The precipitated or otherwise removed heavy metals 14 are separated out in a solid-liquid separation system, whereby an acidic filtrate 15 is obtained. The acidic filtrate 15 is then combined with the alkali wash solution 7 to neutralize 17 these liquids whereby a slurry results which may be separated, as before, into a clarification sludge 18 and a clarification 19.

The single solid residue 11A alone or together with the precipitated heavy metals 14 may be combined in a hazardous waste stabilization system, which may be slag 3, or bitumen 25. When combined in the slag 3, the slag may be reused 21, such as is in highway construction.

The single solid residue 11A is subjected to thermal treatment 30 in order to recover the mercury contained therein in collector 31. Thermal treatment 30 may take place at flue gas temperatures and results in the desorption of mercury. Table 5 presents examples of mercury thermal desorption at various flue gas temperatures. Once mercury has been removed from the single solid residue 11A by the thermal treatment, the solid residue may then be introduced directly into combustion system 2 or added into slag 3 or other hazardous waste stabilization substance, such as bitumen (not shown).

Alternately, if discharging clarified solution 19 from the processes of either FIG. 2 or 3 into a sewer 20 is not possible for engineering or legal reasons, a completely different removal variation for decontamination can be employed. The thermally treated clarification sludge (evaporatively crystallized in step 24 or not) and flue ash 9 may be stabilized by fixing in an inert matrix, i.e., in a hazardous waste stabilizing substance, which may be, for example, slag 3 or, as is customary in the nuclear energy art, bitumen 25, with or without being first thermally treated to recover mercury. The decontaminated waste, i.e., waste stabilized by fixation, such as bitumenization, may then be removed to a storage depot 26.

It will be understood that the above description of the present invention is susceptible to various modifications, changes and adaptations, and the same are intended to be comprehended within the meaning and range of equivalents of the appended claims.

TABLE 1

|     | Flue gas before purification (mg/Nm³) | Flue gas after purification (mg/Nm³) | Yield (%) |
| --- | --- | --- | --- |
| HCl | 1000 | 20 | 98 |
| SO₂ | 500 | 150 | 70 |
| Dust | 5000 | 20 | >99 |
| Hg | 0.4 | 0.1 | 75 |
| Cd | 1.5 | 0.04 | 97 |
| Zn | 75 | 1.5 | 98 |
| Pb | 25 | 0.5 | 98 |

TABLE 1-continued

|     | Flue gas before purification (mg/Nm³) | Flue gas after purification (mg/Nm³) | Yield (%) |
| --- | --- | --- | --- |
| Sb | 3 | 0.05 | 98 |

TABLE 2

|     | Flue ash 9 before leaching (ppm) | Flue ash 11 after leaching (ppm) | Yield % |
| --- | --- | --- | --- |
| Cd | 280 | 40 | 85 |
| Cu | 1100 | 1000 | 10 |
| Ni | 140 | 100 | 30 |
| Pb | 5300 | 5000 | 5 |
| Sb | 580 | 560 | 3 |
| Zn | 16000 | 8000 | 50 |

TABLE 3

| Chlorinated dibenzene dioxin content (ppb) | Flue Ash 9 | Untreated Solid Residue 11 | Solid residue from pyrolysis at 800° C. |
| --- | --- | --- | --- |
| Octa CDD | 70 | 270 | 11 |
| Hepta CDD | 23 | 42 | 8 |
| Hexa CDD | 23 | 20 | 5 |
| Penta CDD | 15 | 19 | 2 |
| Tetra CDD | 10 | 10 | 1 |

TABLE 4

Examples of Mercury Adsorption:
Ratio of flue ash 9 to acidic condensate solution
from condensation/scrubbing step 6 = 37.6 kg/1,000 liter = 100%.

| Flue Ash (%) | Hg in filtrate 12A (ppm) |
| --- | --- |
| 0 | 7.8 |
| 5 | 5.1 |
| 10 | 2.4 |
| 15 | 0.97 |
| 20 | 0.45 |
| 25 | <0.1 |

TABLE 5

Examples of Thermal Desorption of Mercury:

| Temperature (°C.) | Desorption (%) |
| --- | --- |
| 50 | 0 |
| 200 | 2 |
| 250 | 86 |
| 300 | 98 |

What is claimed is:

1. A process for purifying flue gas generated during the combustion of waste materials and containing water vapor and particulates, as well as gaseous, liquid, and particulate pollutants, said gaseous pollutants including hydrochloric acid vapor and heavy metal vapors, and said particulate pollutants including heavy metals, the process comprising:

a. separating the majority of particulates from the flue gas leaving a combustion system in a dry solids separation system and collecting the separated particulates as flue ash, said flue ash containing noxious organic substances;

b. condensing vapors, including water, hydrochloric acid and heavy metal vapors, from the flue gas after it leaves the separation system in a condensation/scrubbing system, whereby an acidic condensate solution containing dissolved heavy metals is formed and the remaining particulates are scrubbed from the flue gas;

c. extracting soluble heavy metals from the collected flue ash with the acidic condensate solution, whereby an extraction slurry is obtained;

d. separating out the extraction slurry in a solid-liquid separation system, whereby a purified residue is recovered and a first acidic filtrate containing dissolved heavy metals is obtained; and e. returning the purified residue to the combustion system to pyrolyze noxious organic substances contained therein, thereby thermally decomposing the noxious organic substances into harmless substances.

2. A process according to claim 1, including the further steps of:

washing the flue gas, previously rendered free of particulates, condensed vapors and heavy metals, with an alkali wash solution to remove polluting gases and provide a purified flue gas;

precipitating the soluble heavy metals extracted from the flue ash and dissolved in the first acidic filtrate by reaction thereof with a precipitating agent;

separating out the precipitated heavy metals in a solid-liquid system, whereby heavy metals are recovered in a compact and concentrated form suitable for reuse and a second acidic filtrate is obtained; and neutralizing the second acidic filtrate by combining it with the alkali wash solution.

3. A process according to claim 2, wherein the heavy metals include mercury and wherein the process includes the further step of subjecting the recovered heavy metals from the separation step to thermal treatment in order to recover the mercury contained therein.

4. A process according to claim 2, wherein the precipitation agent is a sulfide.

5. A process for purifying flue gas generated during the combustion of waste materials and containing water vapor and particulates, as well as gaseous, liquid, and particulate pollutants, said gaseous pollutants including hydrochloric acid vapor and heavy metal vapor, and said particulate pollutants including heavy metals, the process comprising:

a. separating the majority of particulates from the flue gas leaving a combustion system in a dry solids separation system and collecting the separated particulates as flue ash said flue ash containing noxious organic substances;

b. condensing vapors, including water, hydrochloric acid and heavy metal vapors, from the flue gas after it leaves the separation system in a condensation/scrubbing system which forms an acidic condensation solution containing dissolved heavy metals and which scrubs the remaining particulates from the flue gas;

c. mixing the collected flue ash, the acidic condensate solution and a first precipitation agent to precipitate the dissolved heavy metals onto the flue ash thereby concentrating the particulates generated during the combustion, including precipitated heavy metals, into a single solid residue;

d. washing the flue gas, previously rendered free of particulates, condensed vapors and heavy metals, with an alkali wash solution to remove polluting gases and provide a purified flue gas;

e. separating out the single solid residue in a solid-liquid separation system whereby a first acidic filtrate is obtained;

f. precipitating heavy metals from the first acidic filtrate by reaction thereof with a second precipitation agent;

g. separating out the precipitated heavy metals in a solid-liquid separation system, whereby a second acidic filtrate is obtained; and g. neutralizing the second acidic filtrate by combining it with the alkali wash solution.

6. A process according to claim 5, wherein the first and second precipitation agents are sulfides.

7. A process for purifying flue gas generated during the combustion of waste materials and containing water vapor and particulates, as well as gaseous, liquid, and particulate pollutants, said gaseous pollutants including hydrochloric acid vapor and heavy metal vapor, and said particulate pollutants including heavy metals, the process comprising:

a. separating the majority of particulates from the flue gas leaving a combustion system in a dry solids separation system and collecting the separated particulates as flue ash said flue ash containing noxious organic substances;

b. condensing vapors, including water, hydrochloric acid and heavy metal vapors, from the flue gas after it leaves the separation system in a condensation/scrubbing system which forms an acidic condensate solution containing dissolved heavy metals and which scrubs the remaining particulates from the flue gas;

c. mixing the collected flue ash, the acidic condensate solution and a first precipitation agent to precipitate the dissolved heavy metals, which heavy metals include mercury, onto the flue ash thereby concentrating the particulates generated during the combustion, including precipitated heavy metals, into a single solid residue; and d. subjecting the single solid residue to thermal treatment in order to recover the mercury contained therein.

8. A process according to claim 7, wherein the single solid residue contains noxious organic substances and wherein the process includes the further step of returning the single solid residue from the mercury recovery step to the combustion system to pyrolyze the noxious organic substances, thereby thermally decomposing the noxious organic substances into harmless substances.

9. A process according to claim 7, including the further step of combining the thermally treated, single solid residue with a hazardous waste stabilizing substance, whereby the heavy metals and noxious organic substances included in the single solid residue are bound and stabilized.

10. A process according to claim 9, wherein the combustion of waste materials also produces a slag, and wherein the hazardous waste stabilizing substance is the slag.

11. A process according to claim 9, wherein the hazardous waste stabilizing substance is bitumen.

12. A process for purifying flue gas generated during the combustion of waste materials and containing water vapor and particulates, as well as gaseous, liquid, and particulate pollutants, said gaseous pollutants including hydrochloric acid vapor and heavy metal vapor, and said particulate pollutants including heavy metals, the process comprising:

a. separating the majority of particulates from the flue gas leaving a combustion system in a dry solids separation system and collecting the separated particulates as flue ash said flue ash containing noxious organic substances;
b. condensing vapors, including water, hydrochloric acid and heavy metal vapors, from the flue gas after it leaves the separation system in a condensation/scrubbing system which forms an acidic condensate solution containing dissolved heavy metals and which scrubs the remaining particulates from the flue gas;
c. mixing the collected flue ash, the acidic condensate solution and a first precipitation agent to precipitate the dissolved heavy metals onto the flue ash thereby concentrating the particulates generated during the combustion, including precipitated heavy metals, into a single solid residue; and
d. combining the single solid residue with a hazardous waste stabilizing substance, whereby the heavy metals and noxious organic substances included in the single solid residue are bound and stabilized, wherein the combustion of waste materials also produces a slag, and wherein the hazardous waste stabilizing substance is the slag.

13. A process for purifying flue gas generated during the combustion of waste materials and containing water vapor and particulates, as well as gaseous, liquid, and particulate pollutants, said gaseous pollutants including hydrochloric acid vapor and heavy metal vapor, and said particulate pollutants including heavy metals, the process comprising:
a. separating the majority of particulates from the flue gas leaving a combustion system in a dry solids separation system and collecting the separated particulates as flue ash said flue ash containing noxious organic substances;
b. condensing vapors, including water, hydrochloric acid and heavy metal vapors, from the flue gas after it leaves the separation system in a condensation/scrubbing system which forms an acidic condensate solution containing dissolved heavy metals and which scrubs the remaining particulates from the flue gas;
c. mixing the collected flue ash, the acidic condensate solution and a first precipitation agent to precipitate the dissolved heavy metals onto the flue ash thereby concentrating the particulates generated during the combustion, including precipitated heavy metals, into a single solid residue; and
d. combining the single solid residue with a hazardous waste stabilizing substance, whereby the heavy metals and noxious organic substances included in the single solid residue are bound and stabilized, wherein the hazardous waste stabilizing substance is bitumen.

* * * * *